(12) United States Patent
Auzerais et al.

(10) Patent No.: US 7,819,188 B2
(45) Date of Patent: Oct. 26, 2010

(54) MONITORING, CONTROLLING AND ENHANCING PROCESSES WHILE STIMULATING A FLUID-FILLED BOREHOLE

(75) Inventors: Francois Auzerais, Houston, TX (US);
Douglas E. Miller, Boston, MA (US);
Curtis Boney, Houston, TX (US);
Dominique Guillot, Somerville, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 13 days.

(21) Appl. No.: 11/962,190

(22) Filed: Dec. 21, 2007

(65) Prior Publication Data

US 2009/0159272 A1 Jun. 25, 2009

(51) Int. Cl.
*E21B 43/25* (2006.01)
(52) U.S. Cl. .............................. 166/250.01; 166/250.1; 166/308.1
(58) Field of Classification Search ............ 166/250.01, 166/250.1, 308.1
See application file for complete search history.

(56) References Cited

U.S. PATENT DOCUMENTS

| | | | | |
|---|---|---|---|---|
| 4,907,204 A * | 3/1990 | Medlin | ......................... | 367/35 |
| 4,953,137 A | 8/1990 | Medlin | | |
| 5,616,840 A | 4/1997 | Tang | | |
| 5,996,726 A * | 12/1999 | Sorrells et al. | .............. | 181/106 |
| 6,076,046 A * | 6/2000 | Vasudevan et al. | ............. | 702/12 |
| 6,192,316 B1 | 2/2001 | Hornby | | |
| 6,978,211 B2 * | 12/2005 | Soliman et al. | ............... | 702/13 |
| 7,397,388 B2 * | 7/2008 | Huang et al. | ............. | 340/853.3 |
| 7,448,448 B2 * | 11/2008 | Lovell et al. | ................ | 166/279 |
| 7,461,691 B2 * | 12/2008 | Vinegar et al. | ................ | 166/60 |
| 2004/0206494 A1 * | 10/2004 | Stephenson et al. | ...... | 166/250.1 |

FOREIGN PATENT DOCUMENTS

GB 1534854 A 12/1978

OTHER PUBLICATIONS

Patent cooperation treaty, International Search Report, Apr. 27, 2009, 4 pages.

* cited by examiner

*Primary Examiner*—Shane Bomar
(74) *Attorney, Agent, or Firm*—Vincent Loccisano; James McAleenan; Brigid Laffey

(57) ABSTRACT

Tubewaves are used for detection and monitoring of feature state to enhance stimulation operations and remediate failure conditions. For example, proper sealing of perforations may be confirmed based on lack of a reflection of a tubewave by the perforations. Alternatively, at least one of amplitude, frequency, attenuation, dispersion and travel time associated with a tubewave and reflection may be used to determine feature state. If a sealant fails during treatment then the failure condition is indicated by appearance of a tubewave reflection. Consequently, the stimulation operation can be stopped in a timely manner, and remediation by means, for example, of pumping diversion fluid or dropping of balls, can be reinitiated until the difference between the expected responses and responses measured by the instrument along the segment to be stimulated confirm that sealing has taken place and that stimulation of the intended zone can resume. Further, specific remediation steps may be selected based on response of the borehole system to tubewaves. The efficacy of the selected remediation steps may also be determined by response of the borehole system to tubewaves during or after execution of those steps.

18 Claims, 10 Drawing Sheets

MONITORING, CONTROLLING AND ENHANCING PROCESSES WHILE STIMULATING A FLUID-FILLED BOREHOLE

FIELD OF THE INVENTION

This invention is generally related to fluid filled boreholes, and more particularly to monitoring, controlling and improving processes associated with stimulation treatments.

BACKGROUND OF THE INVENTION

Stimulation treatments may be performed in order to enhance production from a fluid filled borehole such as an oil or gas well. Examples of stimulation treatments include hydraulic fracturing (fracing) and insertion of materials and chemical substances which alter either or both of the formation and the perforations in the well completion, e.g., an acid ballout. The intended result of the treatment can be to enhance production by altering the perforations, altering the formation adjacent to the perforations, creating new perforations, or combinations thereof.

Chemical or mechanical sealants are often used to alter hydraulic connectivity at various locations in the borehole system during stimulation treatments. For example, at each stage in a multiple stage fracture treatment the previously fractured zones are isolated by pumping diversion fluid or ball sealers into the borehole from the surface in order to seal the perforations of the previously fractured zone. In a simple acid ballout treatment the sealants are used to seal those perforations which already have low hydraulic resistance to flow. Acid is then pumped into the zone to reduce hydraulic resistance at non-sealed perforations. Alternatively, new perforations are created by pumping fluid into the zone in order to increase pressure to a point of opening perforations, slots or higher pressure intervals.

The state of the sealants and perforations during stimulation affects the outcome of the treatment. In particular, because unsealed perforations are in hydraulic communication with one another, treatment of target perforations can degrade or fail if sealing of other perforations fails during pumping. One problem faced by operators is that determining the state of sealants and perforations can be difficult or impossible. In the case of an acid treatment, it is difficult or impossible to determine whether the fluid and pressure are cleaning the intended zone or flowing past a failed seal. Similarly, in the case of fracing, it is difficult or impossible to determine whether particular zones or perforations are opening a new fracture or expanding an old fracture behind a failed seal.

With regard to determining conditions in a fluid-filled borehole, U.S. patent application Ser. No. 11/691,071 entitled WIRELESS LOGGING OF FLUID FILLED BOREHOLES, filed 31 Oct. 2007, incorporated by reference, describes locating and monitoring changes in downhole conditions by recording, generating and analyzing tubewaves propagating in the borehole system.

SUMMARY OF THE INVENTION

In accordance with an embodiment of the invention, a method for treating a fluid-filled borehole having at least one feature, comprises the steps of: performing a first treatment-related operation on the feature; determining whether the first treatment-related operation was successful by: initiating a tubewave in the borehole, sensing response of the borehole to the tubewave, and calculating feature state based on the sensed response; and if the treatment-related operation is determined to be unsuccessful, selecting a first remediation operation based on the sensed response; and performing the first remediation operation.

In accordance with another embodiment of the invention, apparatus for treating a fluid-filled borehole having at least one feature, comprises: a transmitter; a receiver; and a processing unit operable to determine whether the first treatment-related operation performed on the feature was successful by prompting the transmitter to initiate a tubewave in the borehole, receiving a signal indicative of response of the borehole to the tubewave sensed by the receiver, and calculating feature state based on the sensed response, and, if the treatment-related operation is determined to be unsuccessful, to select a first remediation operation based on the sensed response.

An advantage of the invention is that feature state can be determined and verified in order to enhance stimulation treatment. For example, proper sealing of perforations may be confirmed based on lack of a tubewave reflection by the perforations. Alternatively, at least one of amplitude, frequency, attenuation, dispersion and travel time associated with a tubewave and reflection may be used. If a sealant fails during treatment then the condition will be indicated by appearance of a tubewave reflection. Consequently, the stimulation operation can be stopped in a timely manner, and remediation by means, for example, of pumping diversion fluid or dropping of balls, can be reinitiated until the difference between the expected responses and responses measured by the instrument along the segment to be stimulated confirm that sealing has taken place and that stimulation of the intended zone can resume. The operations of controlling the flow of stimulation fluid in the stage of interest and verifying sealing of perforations in other zones can be repeated in order to stimulate multiple zones in a selected sequence.

Further features and advantages of the invention will become more readily apparent from the following detailed description when taken in conjunction with the accompanying drawings.

DETAILED DESCRIPTION

Figure 1:
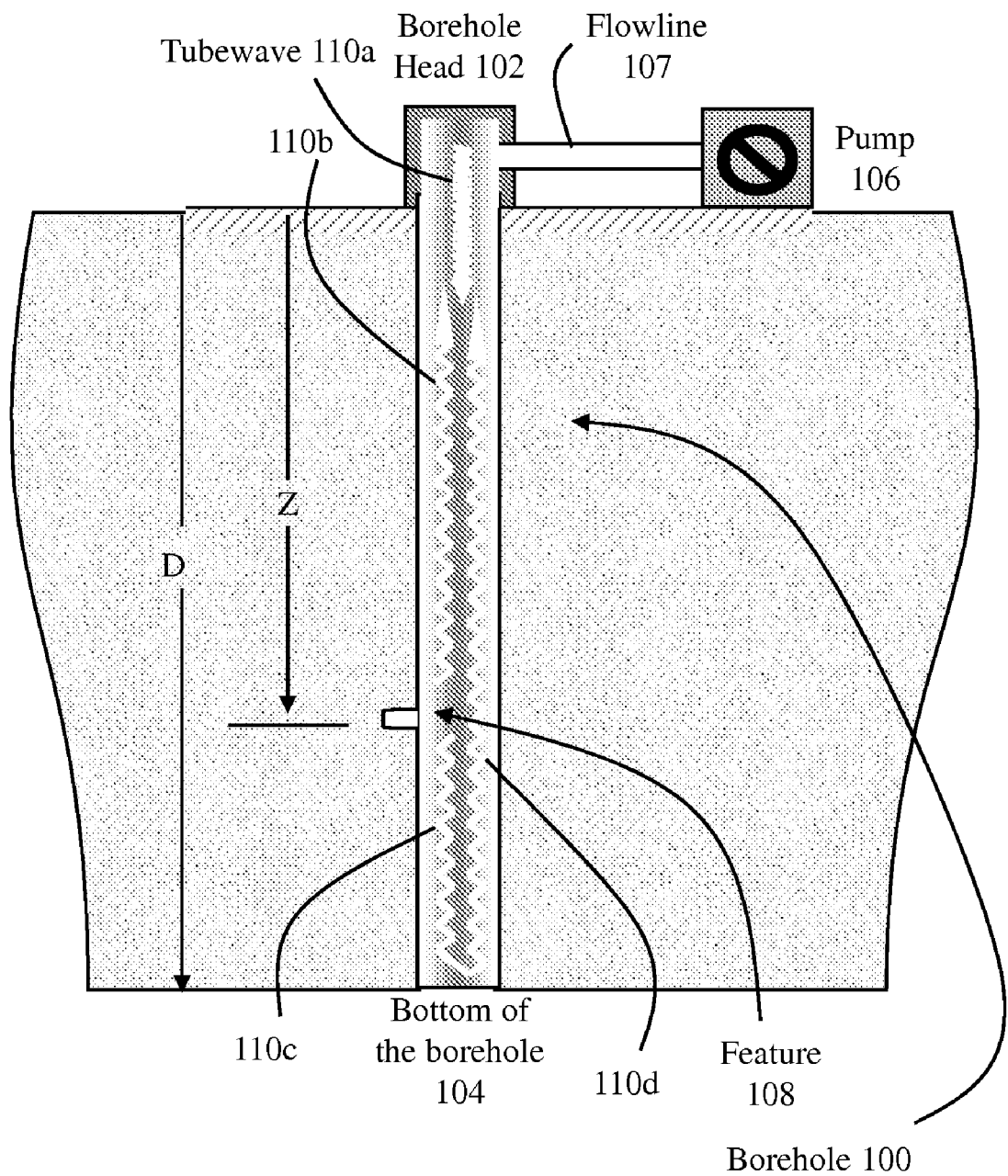
FIG. 1 is a schematic illustrating use of direct and reflected tubewaves to calculate state and location of a feature in the borehole system.

FIG. 1 illustrates a borehole system which includes a fluid-filled borehole (100) having a head (102) and a bottom (104). A pump (106) is connected to the borehole via a flowline (107) in order to control fluid flow within the borehole, introduce materials and substances into the borehole, and change the fluid pressure within the borehole. The borehole (100) also includes at least one feature (108) of interest. For example, and without limitation, the feature (108) may include one or more perforations in the borehole wall that enable hydraulic flow between the formation and the borehole. The feature is deemed to be of interest because its location and state affect production or the outcome of stimulation treatments, where "state" indicates at least one of existence, non-existence, being sealed, being unsealed, size, shape, and flow properties. It should be noted that although the head is shown at surface level, that is not a limitation of the invention. Further, although the borehole is illustrated as being perpendicular to the surface and linear from head to bottom for simplicity of description and illustration, the borehole may be at any angle and have changes of direction.

In accordance with one embodiment, a tubewave analysis technique is utilized to calculate the state of the feature (108) in order to facilitate stimulation treatments. State can be calculated from the reflective properties of the feature (108). A tubewave (110a) is initiated in order to determine the reflective properties of the feature (108). The initiated tubewave (110a) propagates through the borehole (100) and may be reflected by the feature (108). If the tubewave (110a) is reflected by the feature (108), the result is a reflected tubewave (110b). In a simple case, the state of the feature (108) may be determined from the mere presence or absence of reflected tubewave (110b). In particular, a perforation or valve that is closed may produce no reflection, whereas a perforation or valve that is open may produce some reflection. In more complex instances, properties of the reflected tubewave (100b) such as amplitude, frequency, attenuation, dispersion and travel time may be used in feature state calculations.

Since the borehole may include multiple and varied features of interest, both nearby and at various different locations, it is sometimes desirable to know feature location in addition to feature state. In accordance with one embodiment, the tubewave analysis technique can also be utilized to calculate the locations of features (108). Provided a feature reflects the initiated tubewave (110a) within the borehole in at least one state, the location of the feature can be calculated when the feature is in that state. In order to facilitate calculation of feature location, the initiated tubewave (110a) is generated at either a known remote location, at a known time, or both. Although the remote location is depicted as being proximate to the borehole head, any location apart from that of the feature itself may be utilized, as will be explained in greater detail below. The initiated tubewave (110a) propagates through the borehole and, for at least one state of the feature, is reflected by the feature (108). The reflected tubewave (110b) is detected at either a known time, a known location, or both. The location of the feature can then be calculated from either (A) the round trip propagation time of the initial tubewave (110a) and the reflected tubewave (110b), or, alternatively, (B) a comparison of the time of arrival of the reflected tubewave (110b) with that of a second reflected tubewave (110d) which results from a tubewave (110c) that is the portion of tubewave (110a) not reflected by the feature (108), but reflected by some other element at a known location, including but not limited to the bottom (104) of the borehole.

Calculation of feature location from the round trip propagation time of the initial tubewave (110a) combined with the reflected tubewave (110b) generally requires some knowledge of propagation speed. In particular, propagation speed should be known if the calculation of location is based on speed and round trip time. The propagation speed, V, of a tubewave in a fluid-filled cased borehole can be described as:

$$V=[\rho(1/B+1/(\mu+(Eh/2b)))]^{-1/2},$$

where $\rho$ is fluid density, B is the bulk modulus of the fluid, $\mu$ is the shear modulus of the rock, E is Young's modulus for the casing material, h is the casing thickness and b is the casing outer diameter. For a water-filled borehole, an acceptable approximation of V is 1450 m/s. For drilling mud this velocity may vary slightly due to increases in the density, $\rho$, or changes in the bulk modulus, B. Either density or bulk modulus can be measured for a particular fluid under consideration, and modifications made to the value of V if necessary. With knowledge of speed and time, the distance traveled by the tubewave and reflection can be calculated. That distance is then used to calculate feature location (depth) based on the known locations of the transmitter and receiver.

Various algorithms may be employed to facilitate calculation of feature location from the arrival time delta of tubewaves. In one embodiment, with a borehole of known total depth, D, and a feature at an unknown depth, Z, occurring at unknown time, $T_0$, the reflected tubewave (110b) is detected at time $T_1$. If the time of the acoustic disturbance $T_0$ and the depth, Z, are unknown, the result cannot be calculated from $T_1$ alone. However, if the arrival time, $T_2$, of the tubewave (110d) reflected from the bottom of the borehole is recorded then two equations for two unknowns are available:

$$T_1-T_0=Z/V$$

and $$T2-T_0=(2D-Z)/V.$$

The unknown origin time can then be eliminated from these two equations to obtain an expression for the depth of the acoustic disturbance:

$$Z=D-V(T_2-T_1)/2.$$

Figure 2:
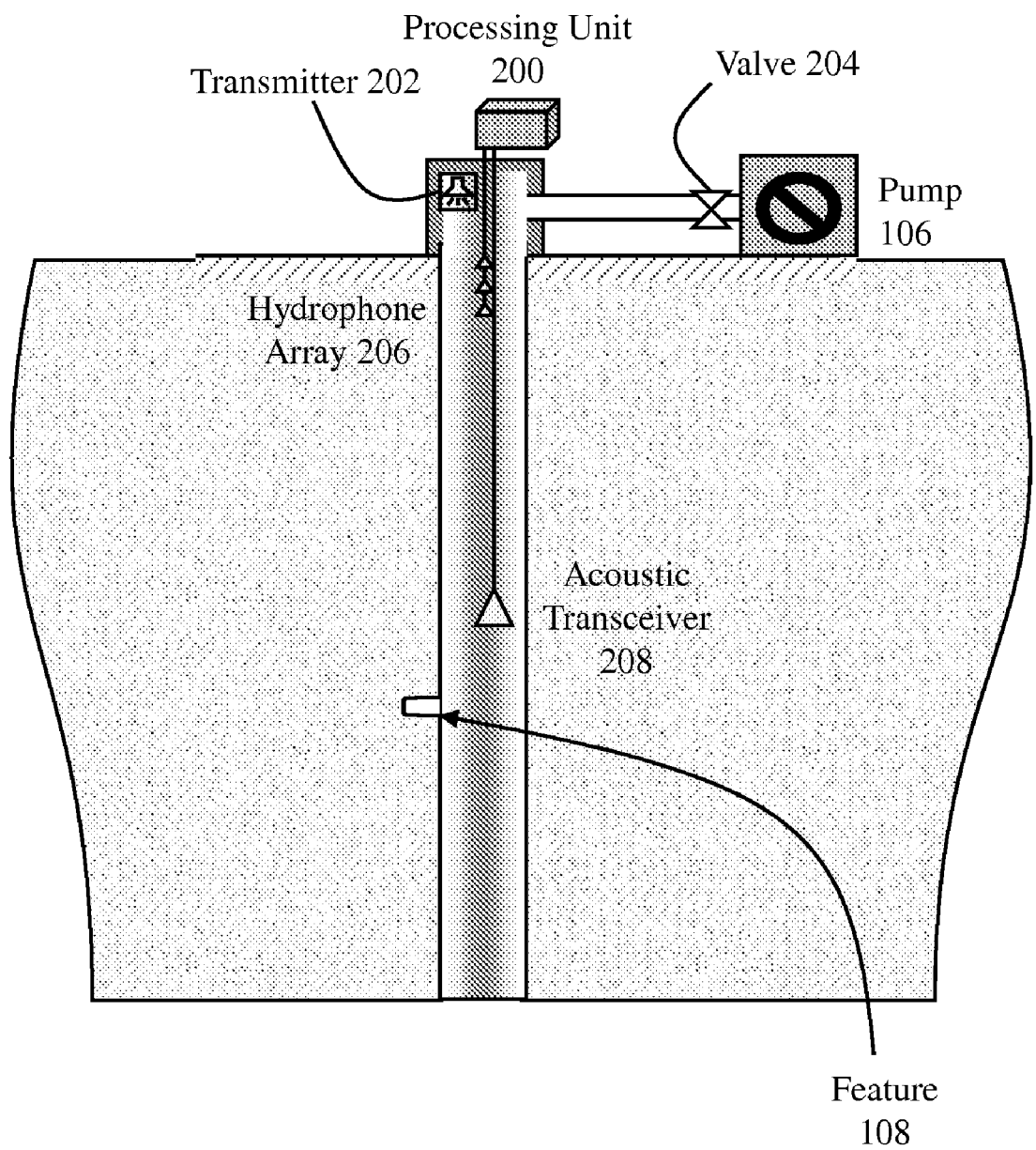
FIG. 2 is a schematic illustrating transmitters and receivers for implementing the technique of FIG. 1.
Figure 3:
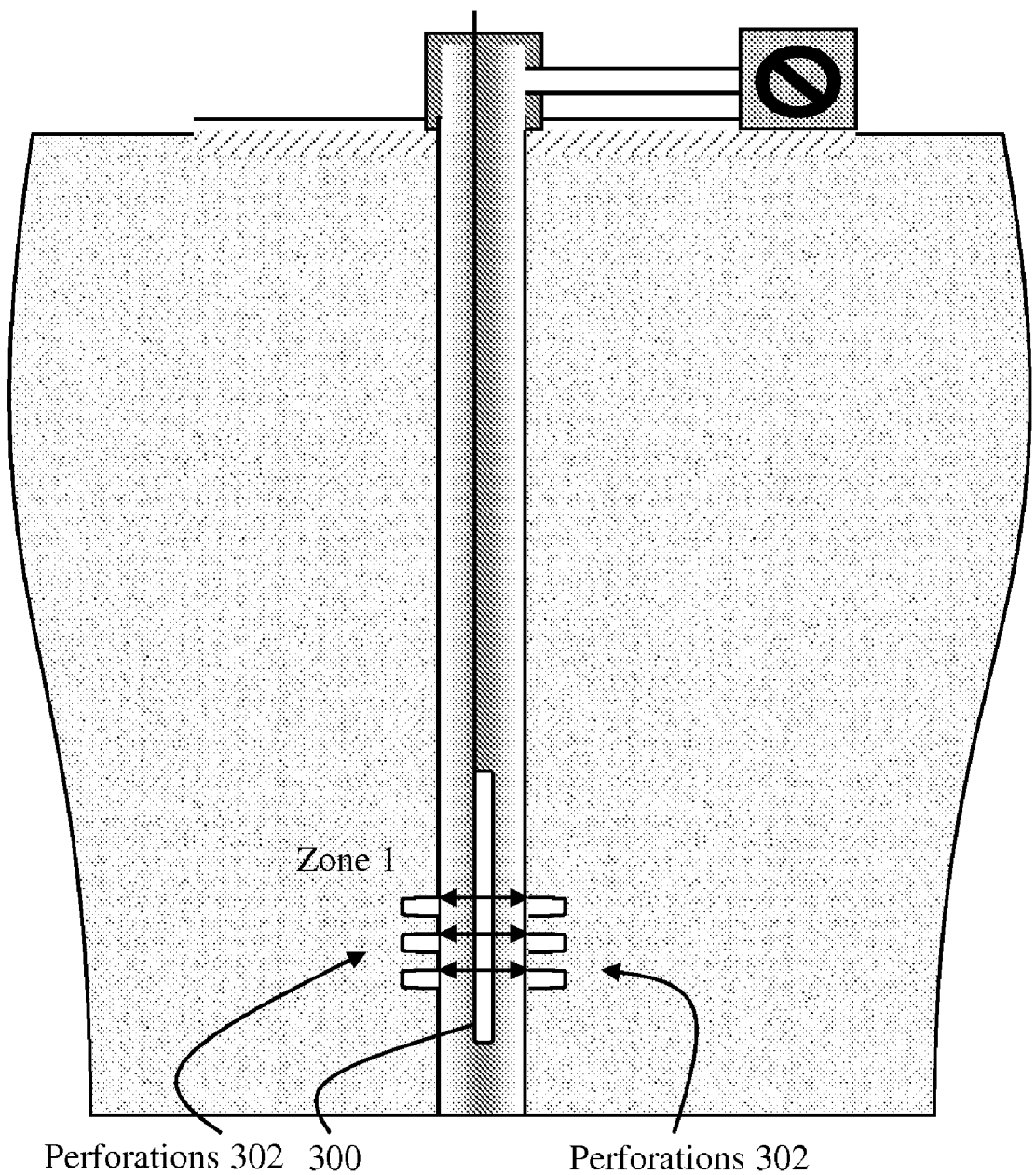
FIGS. 3 through 6 and 8 through 9 are schematics illustrating use of the inventive technique to facilitate a multiple stage fracturing treatment.

Referring to FIG. 2, apparatus for implementing the tubewave analysis technique for facilitating stimulation treatments may include a processing unit (200), at least one acoustic transmitter (106, 202, 204, 208) and at least one acoustic receiver (206, 208). The processing unit (200) is in communication with the transmitter and receiver, and functions to control the analysis. In particular, the processing unit prompts the transmitter to generate an acoustic disturbance at a known time (and possibly at a known location), as indicated by a clock circuit of the processing unit. The processing unit also receives and interprets signals associated with reflected tubewaves via the receiver. Microprocessors within the processing unit analyze the features of interest in the borehole in accordance with the algorithms described above, or other techniques. Further, the processing unit may include a memory for storing data which describes the borehole and results of analyses. The processing unit may also include an interface for providing an indication of the state and location of features.

The transmitter may include various devices capable of generating a pressure/flow change, including but not limited to a dedicated transmitter (202) which creates an implosion, explosion, or piezoelectric force. Further, the pump (106), valve (204), or other means may be actuated in order to function as a transmitter. The transmitter or transmitters may be disposed at any location in the borehole system. Whatever means are used, the initiated tubewave (110a) comprises an acoustic disturbance which can take any of various forms. For example, the acoustic disturbance could include a continuous wave, or one or more discreet pulses created by changing pressure or flow of the fluid. Since pressure and flow are interrelated in the borehole system, changing one necessarily changes the other. In terms of frequency, the acoustic disturbance will typically be in the range from DC to 40 kHz, with perhaps the most useful frequencies being in the range from 0.1 Hz to 2 kHz.

The receiver may include any of various devices capable of sensing a pressure/flow change. For example, and without limitation, the receiver may include any number of individual sensors, such as an acoustic transceiver (208) or an array of hydrophones (206). The sensor or sensors are disposed in a suitable position to detect the acoustic disturbances generated within the borehole fluid. For example, a sensor could be disposed near the head or a sensor may be disposed closer to the feature of interest. Further, the sensor may be either fixed, e.g., to the casing, or mobile, e.g., connected to coiled tubing.

A variety of techniques may be employed to detect and process tubewave arrival times and arrival delays. Examples include, but are not limited to, manual picking, automatic thresholding algorithms, and autocorrelation based approaches. More sophisticated approaches may be utilized if the typical noise field is more complex. Modeling may be employed to interpret the acoustic disturbance as received by the sensor in order to determine a prediction of some attribute of the recorded data, where the attribute includes at least one of amplitude, frequency, attenuation, dispersion and travel time. The response of the system is generally characterized by reflections of alternating polarity which decrease in amplitude over time. In the case where a series of pulses are being transmitted, it is useful for the processing unit to process the received disturbance to filter noise, distinguish the initial pulse from reflections of earlier pulses, and otherwise account for changes in the transmitted disturbance. More particularly, the processing unit is operable to account for various parameters of the borehole system which can cause changes in the acoustic disturbance between the transmitter and the receiver, including but not limited to wellbore system geometry, viscoacoustic properties of the fluid and entrained solids contained in the wellbore system, locations of boundaries and entrained solids, and characteristics and locations of disturbances may alter the acoustic disturbance in transit. The receiver unit may accomplish this by utilizing a model of one or more of these parameters. The model, which may be stored in memory in the processing unit, is utilized to interpret the acoustic disturbance as received by the sensor in order to determine a best prediction of some attribute of the recorded data, where the attribute includes at least one of amplitude, frequency, attenuation, dispersion and travel time.

Figure 4:
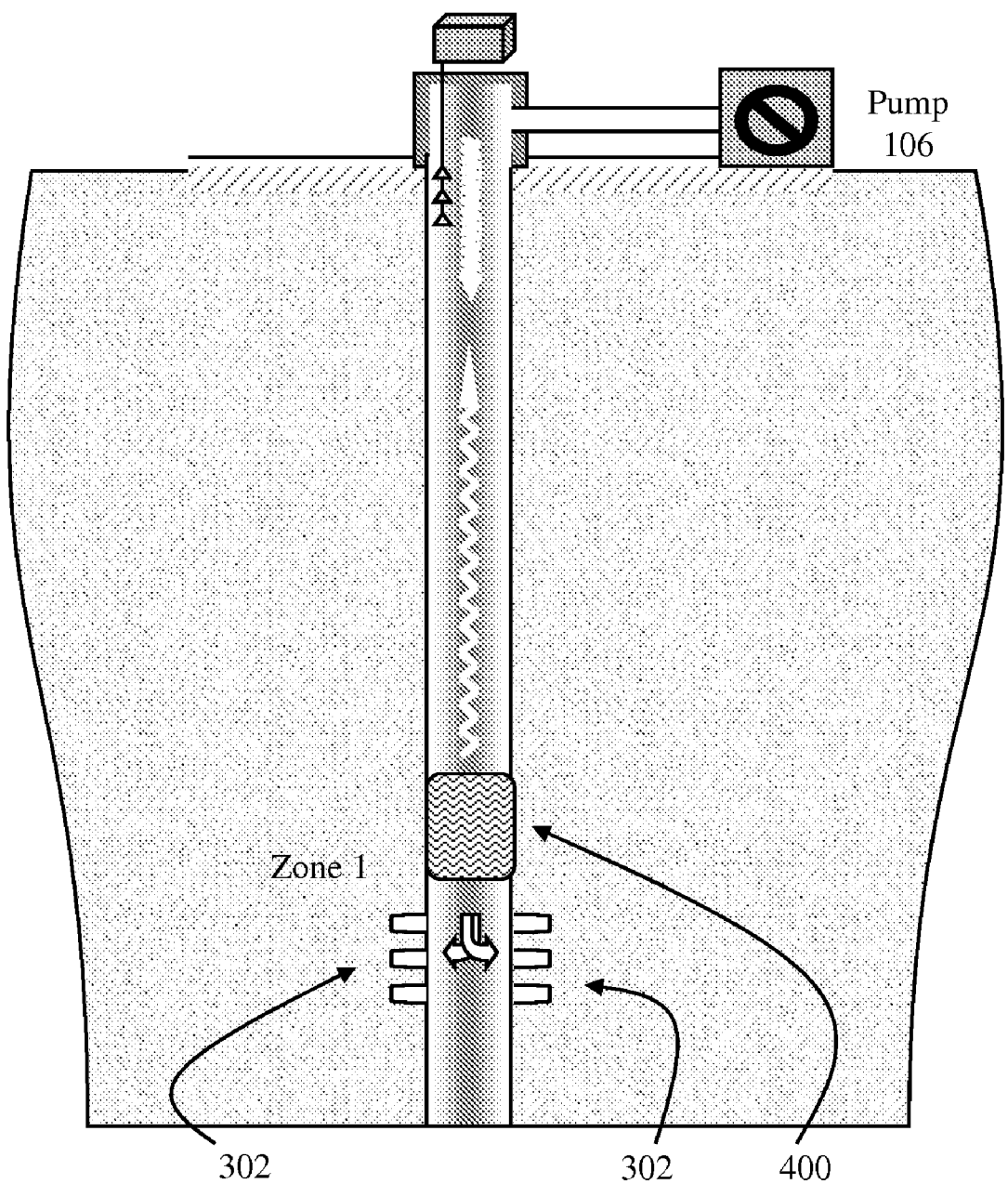

FIGS. 3 through 6 and 8 through 9 are schematics illustrating use of the inventive technique to facilitate a multiple stage fracturing treatment. At the stage shown in FIG. 3 a new zone (Zone 1) is being created. A perforating gun (300) is lowered into place in the borehole and used to create perforations (302) in the casing. As shown in FIG. 4, Zone 1 is then subjected to a stimulation fluid such as acid (400), the location of which may be monitored by its effect on tubewaves. Zone 1 is then subjected to increased pressure via operation of pump (106) in order to hydraulically fracture (frac) the formation proximate to the perforations (302). If the frac procedure is successful, creation of Zone 1 is then complete.

Figure 5:
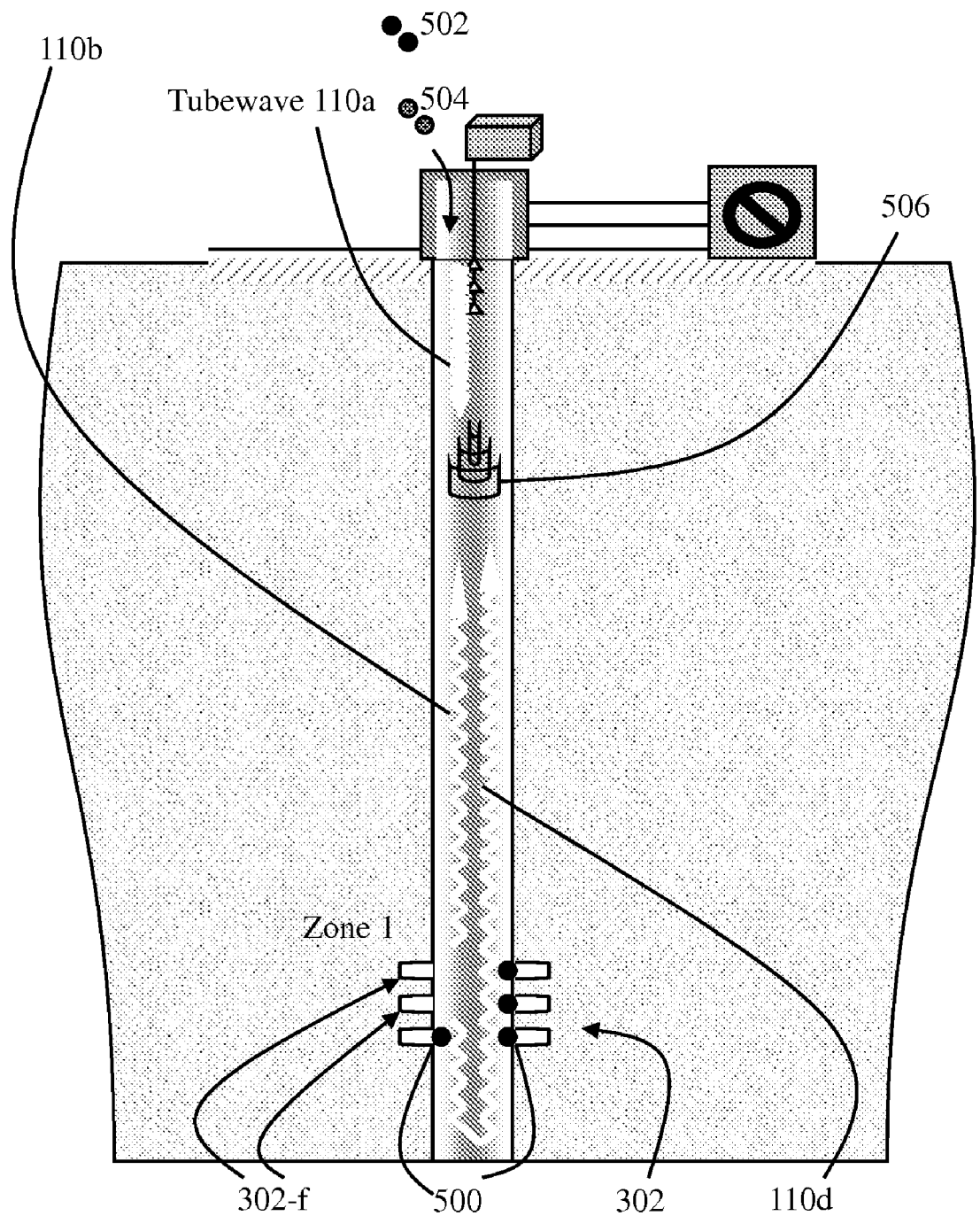

As shown in FIG. 5, sealant (500) is introduced into Zone 1 in order to isolate the perforations (302) in preparation for creation of another zone (Zone 2). The state of the sealant (500) relative to the perforations (302) is also indicative of the outcome of the Zone 1 frac procedure. In particular, properly fraced perforations exhibit low hydraulic resistance to flow, and will more readily become sealed. If some perforations in Zone 1 were not properly fraced, the condition will be indicated by perforations that will not seal and actions may be taken to remediate the situation. Examples of remediation operations include, but are not limited to, introducing additional sealant, modifying the sealant, introducing a different sealant, attempting to dislodge sealant from an undesirable location with a pressure pulse, introducing sealing fibres or other materials in order to seal a leak, reconfiguring tap valves, and otherwise modifying the borehole environment. The success or failure of the remediation treatment is indicated by the state of the perforations during and after treatment. In particular, the technique permits verification that the treatment of zone 1 is completed to the extent required before moving on to zone 2, and possibly analysis of why the treatment or remediation failed.

Figure 6:
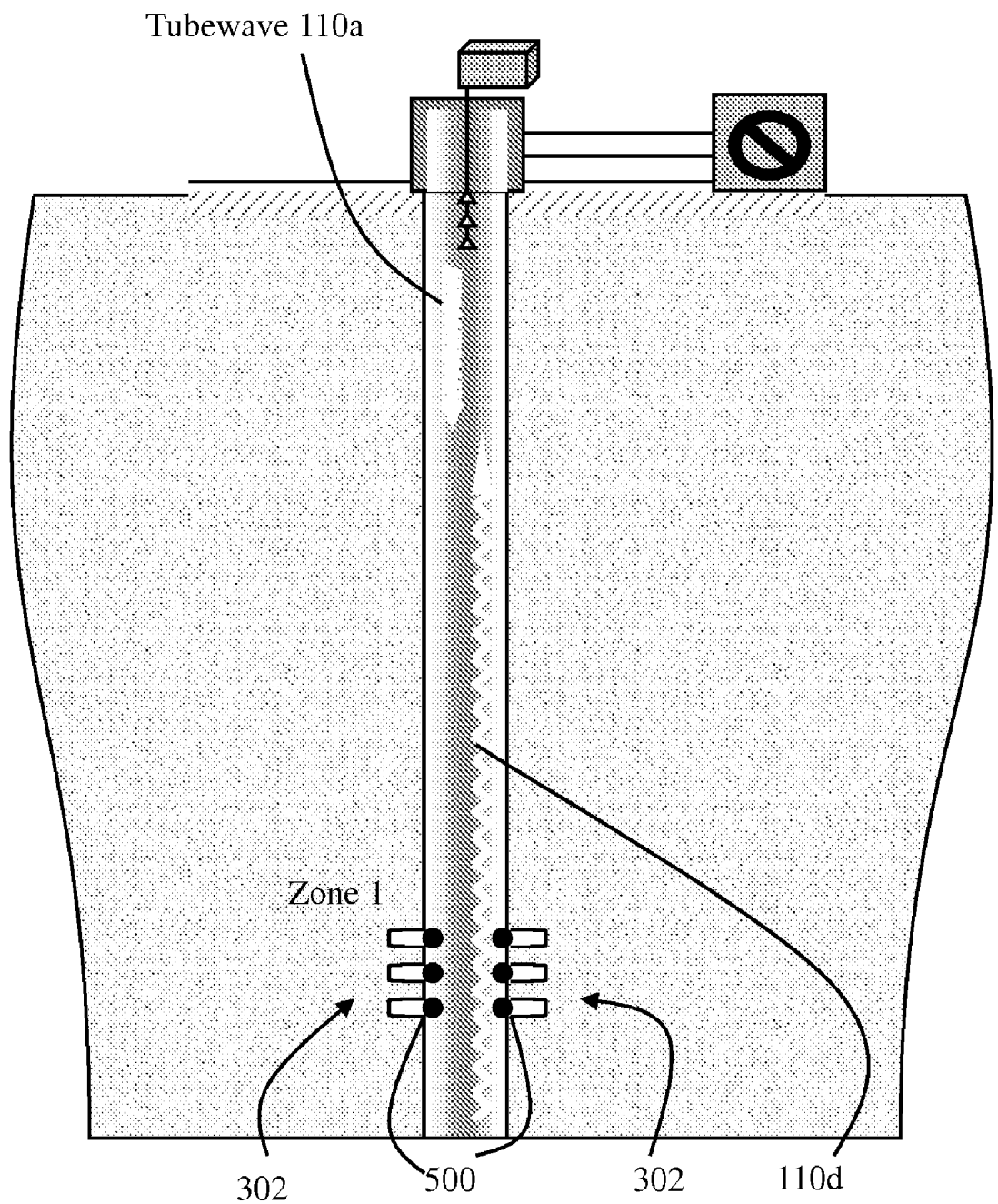
Figure 7:
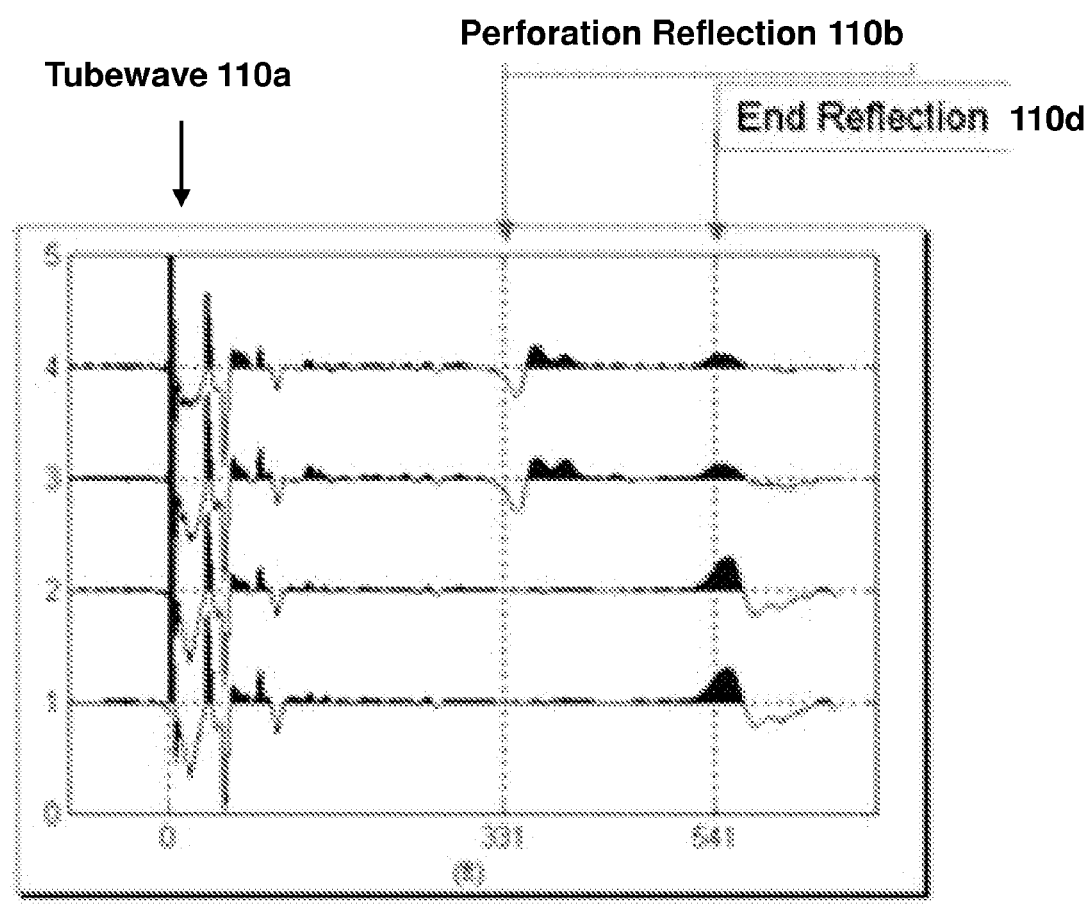
FIG. 7 is a graph illustrating change in the state of a feature.

Referring to FIGS. 5 through 7, the presence of improperly fraced perforations (302-f) can be detected via the tubewave analysis technique because those perforations tend to cause reflections. In particular, the state of the perforation sealants may be calculated from the strength of the reflection of tubewave (110b), e.g., the reflection coefficient, as interpreted by a model of effects of the borehole system on the acoustic disturbance. In the illustrated example the presence of a tubewave (110b) attributable to perforation reflection at times $T_3$ and $T_4$ indicates at least one perforation (302-f) in an unsealed state (See FIG. 5), and the absence of perforation reflection at times $T_1$ and $T_2$ indicate all perforations in a sealed state (See FIG. 6). In the case of a tightly grouped array of perforations it may be difficult to distinguish the state of individual perforations. However, the magnitude of the reflection may indicate the proportion of perforations that are sealed. Alternatively, multiple reflected disturbances can be detected over time in order to obtain information from the magnitude and rate of change in reflection coefficient over time.

It should be noted that the technique may also be employed to monitor the location and state of a plug or sand pack being used to help isolate a zone. The state of isolating features is useful information because, being furnished with that knowledge, the operator may repeat or adjust the frac operation before transitioning to a subsequent stage of the treatment. Further, if perforation sealants are utilized to hydraulically isolate zones then it is desirable that all of the perforations of that zone be properly sealed.

Figure 8:
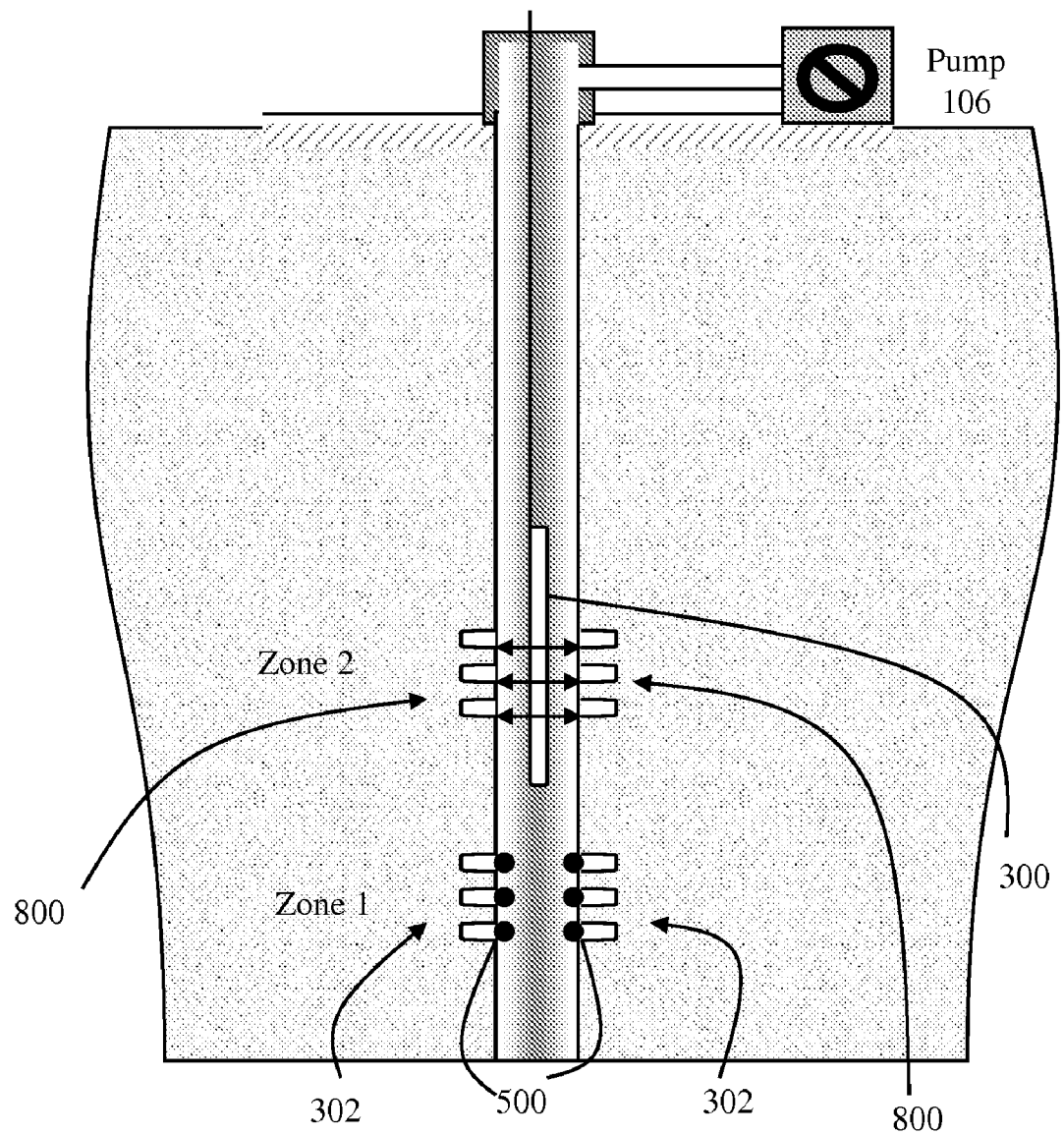
Figure 9:
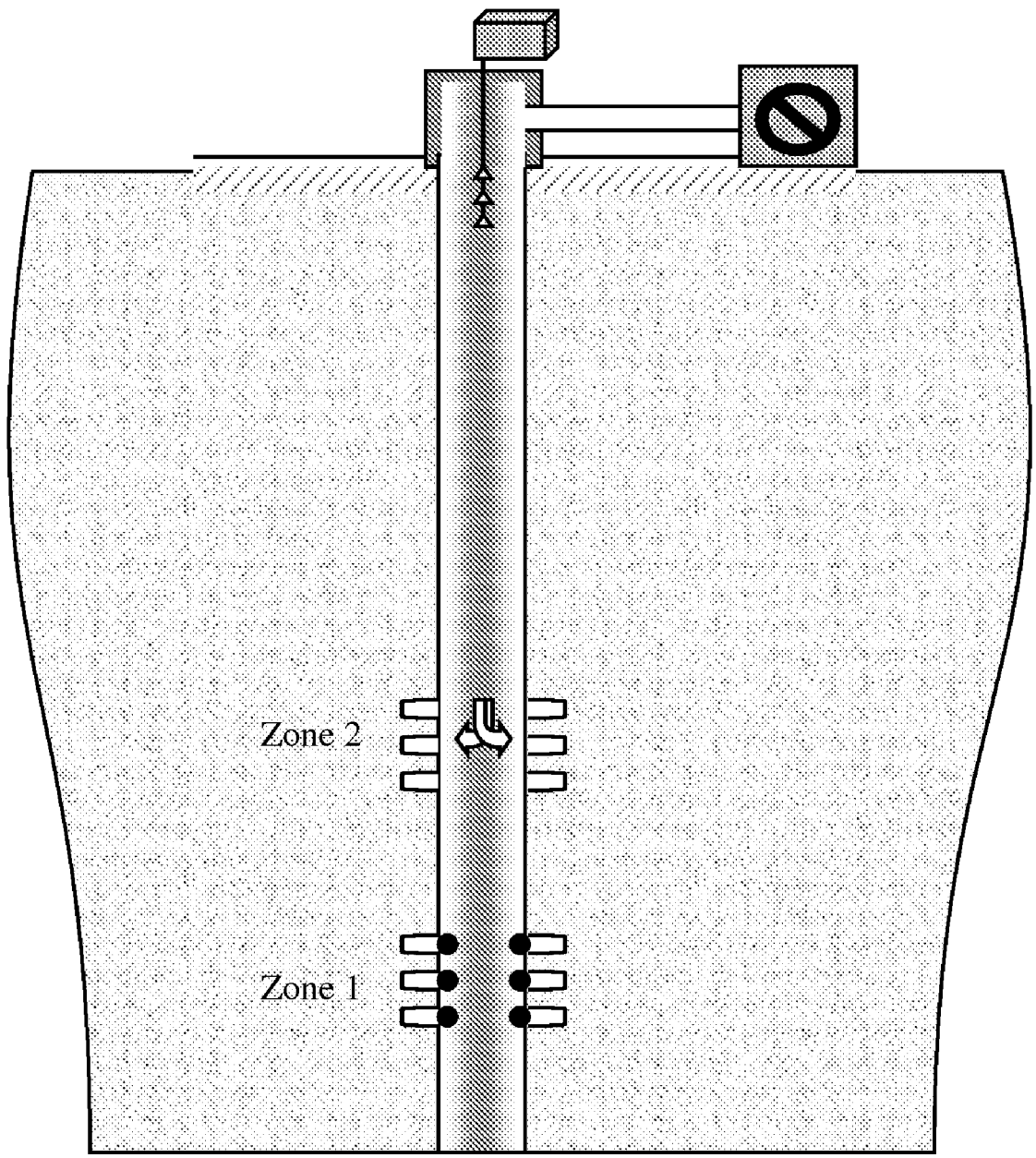

Referring to FIG. 8, having verified that the zone 1 perforations (302) are properly fraced and sealed based on tubewave analysis (possibly following remediation treatment), the perf gun (300) is positioned at zone 2 to create a second set of perforations (800). The location of the perf gun may be calculated with tube waves, measured paying-out of cable, or some combination thereof. As shown in FIG. 9, zone 2 is then subjected to stimulation fluid and fraced by increasing pressure with the pump (106). The integrity of the zone 1 sealants (500) is monitored during this stage in order to verify that changes in hydraulic resistance are attributable to the fracing of zone 2 perforations (800), rather than the zone 1 perforations (302). Although not specifically shown, this procedure can be repeated to generate any number of new zones. At each stage the tube wave analysis technique can be employed to verify that the perforations associated with previously created stages are properly sealed, and that the new stage is properly fraced.

Figure 10:
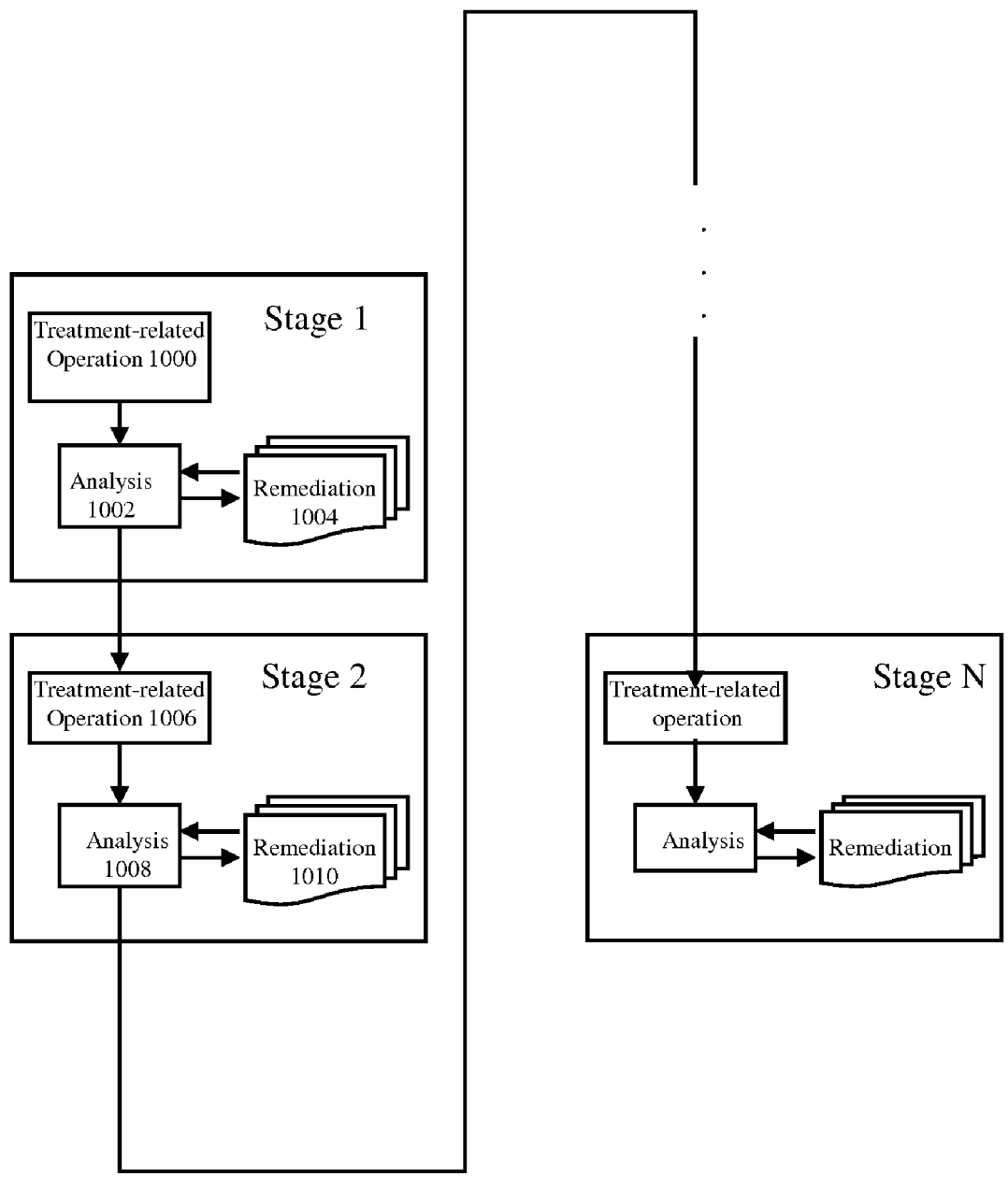
FIG. 10 illustrates a method in accordance with an embodiment of the invention.

Referring now to FIG. 10, an embodiment of the invention is a method for monitoring, controlling or enhancing processes while stimulating a fluid-filled borehole. The method includes at least one stage at which tubewave analysis is utilized to determine whether a treatment-related operation or remediation is successful. The method may also include multiple sequential stages. Typically, method-flow will not proceed to a subsequent stage unless a previous stage is completed successfully. In stage 1 of the illustrated example a treatment-related operation is performed on a feature at step (1000). The treatment-related operation could be, simply for example and without limitation, creating perforations, sealing perforations, subjecting perforations to chemicals, subjecting perforations to a change in pressure, and any other treatment-related operation described in this application. The result (e.g., success or failure) of the treatment-related operation is determined by tubewave analysis in step (1002). If the analysis indicates that the treatment-related operation was unsuccessful, one or more remediation measures is selected and performed in step (1004). The result of the remediation measures is then determined by tubewave analysis in step (1002). Steps (1002) and (1004) may be repeated until the remediation measure selected and performed is deemed to be successful. Further, the steps may be recursive, i.e., the remediation measure selected for performance in step (1004) may be selected based on indicators in the result of the analysis step (1002). For example, if the analysis were to indicate presence of a leak then the selected remediation step could include sealing the leak, whereas if the analysis were to indicate a sealant ball lodged in an undesirable location then the selected remediation step could include subjecting the borehole to a pressure pulse in an attempt to dislodge the ball. When the results of the analysis step (1002) indicate success, another treatment-related operation may be performed in step (1006) in stage 2. That treatment step (1006) is followed by analysis in step (1008), the results of which will prompt either continuation to a subsequent stage (if any) or selection and performance of remediation measures in step (1010). As described above, the remediation step may be selected based on the results of the analysis (1008). This method may continue for N stages, but can be for as few as one stage.

Those skilled in the art will recognize that a variety of different services might be enabled or facilitated by the invention. For example, aspects of the invention might be employed alone or in combination with microseismic data to diagnose effectiveness of a multistage horizontal fracturing. Provided that ineffectively treated perforation clusters or intervals produce a quantifiably different tubewave signature than effectively treated perforation clusters or intervals, tubewave analysis could be utilized to assess which stages and perforation clusters have been effectively stimulated. Tubewave analysis could also be used to determine which clusters have been effectively isolated. Tubewave analysis could also be used to select treatments, treatment-related operations and remediation measures. Further, tubewave analysis could facilitate determining the number of open/active perforations. Still further, tubewave analysis may facilitate identifying and monitoring sand accumulation inside a casing during a fracturing operation. Sand accumulation related to fracturing can be significant, particularly in horizontal wells. In order to mitigate potential problems related to sand accumulation it is known to locate perforation clusters at a safe distance from locations susceptible to sand accumulation. However, perforation clusters may still be sanded-off, so it would be useful to be able obtain data indicative of the magnitude and location of sand accumulation. For example, it may be prudent to identify sand accumulation prior to performing treatment-related operations because the sand my affect those operations.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for treating a fluid-filled borehole having at least one feature, comprising the steps of:
   Performing and completing a first treatment-related operation on the feature;
   providing a processing unit operable to:
      determining whether the first treatment-related operation was successful or unsuccessful by:
         initiating a tubewave in the borehole,
         sensing response of the borehole to the tubewave, and
         calculating feature state based on the sensed response; and
      if the treatment-related operation is determined to be successful:
         performing a second treatment-related operation; or
      if the treatment-related operation is determined to be unsuccessful:
         selecting a first remediation operation based on the sensed response; and
         performing the first remediation operation.

2. The method of claim 1 including the further step of determining whether the first remediation operation is successful or unsuccessful by initiating a tubewave in the borehole, sensing response of the borehole to the tubewave, and calculating feature state based on the sensed response.

3. The method of claim 2 including the further step of, if the first remediation operation is determined to be unsuccessful, selecting a second remediation operation based on the sensed response after completion of the first remediation operation.

4. The method of claim 3 including the further step of performing the second remediation operation.

5. The method of claim 1 wherein calculating feature state includes calculating, for at least one perforation, at least one of existence, non-existence, being sealed, being unsealed, size, shape, and flow properties.

6. The method of claim 1 wherein the feature includes at least one perforation, and wherein performing a first treatment-related operation includes hydraulically fracturing a portion of the formation proximate to the perforation.

7. The method of claim 1 wherein the feature includes at least one perforation, and wherein performing a first treatment-related operation includes exposing the perforation to a chemical.

8. The method of claim 1 wherein calculating feature state includes determining whether the tubewave is reflected by the feature.

9. The method of claim 1 wherein calculating feature state includes utilizing at least one of amplitude, frequency, attenuation, dispersion and travel time associated with the tubewave and reflection.

10. Apparatus for treating a fluid-filled borehole having at least one feature, comprising:
   a transmitter;
   a receiver;
   a processing unit operable to determine whether a first treatment-related operation performed and completed on the feature was successful or unsuccessful by prompting the transmitter to initiate a tubewave in the borehole, receiving a signal indicative of response of the borehole to the tubewave sensed by the receiver, and calculating feature state based on the sensed response, and:
   if the treatment-related operation is determined to be successful, to perform a second treatment-related operation; or if the treatment-related operation is determined to be unsuccessful, to select a first remediation operation based on the sensed response.

11. The apparatus of claim 10 wherein the processing unit is further operative to determine whether the first remediation operation is successful or unsuccessful by prompting the transmitter to initiate a tubewave in the borehole, receiving a signal indicative of response of the borehole to the tubewave sensed by the receiver, and calculating feature state based on the sensed response.

12. The apparatus of claim 11 wherein the processing unit is further operative, if the first remediation operation is determined to be unsuccessful, to select a second remediation operation based on the sensed response after completion of the first remediation operation.

13. The apparatus of claim 12 wherein the processing unit is further operative to prompt performance of the second remediation operation.

14. The apparatus of claim 10 wherein the processing unit is further operative to calculate feature state by calculating, for at least one perforation, at least one of existence, non-existence, being sealed, being unsealed, size, shape, and flow properties.

15. The apparatus of claim 10 wherein the feature includes at least one perforation, and wherein the first treatment-related operation includes hydraulically fracturing a portion of the formation proximate to the perforation.

16. The apparatus of claim 10 wherein the feature includes at least one perforation, and wherein the first treatment-related operation includes exposing the perforation to a chemical.

17. The apparatus of claim 10 wherein the processing unit determines whether the tubewave is reflected by the feature.

18. The apparatus of claim 10 wherein the processing unit utilizes at least one of amplitude, frequency, attenuation, dispersion and travel time associated with the tubewave and reflection for feature state calculation.

* * * * *